April 17, 1956 L. P. FRIEDER ET AL 2,742,174
RADIOSONDE BATTERY COMPARTMENT
Filed Feb. 18, 1953 2 Sheets-Sheet 1

INVENTORS
LEONARD P. FRIEDER
WALTER S. FINKEN
BY
ATTORNEY

April 17, 1956 — L. P. FRIEDER ET AL — 2,742,174
RADIOSONDE BATTERY COMPARTMENT
Filed Feb. 18, 1953 — 2 Sheets-Sheet 2
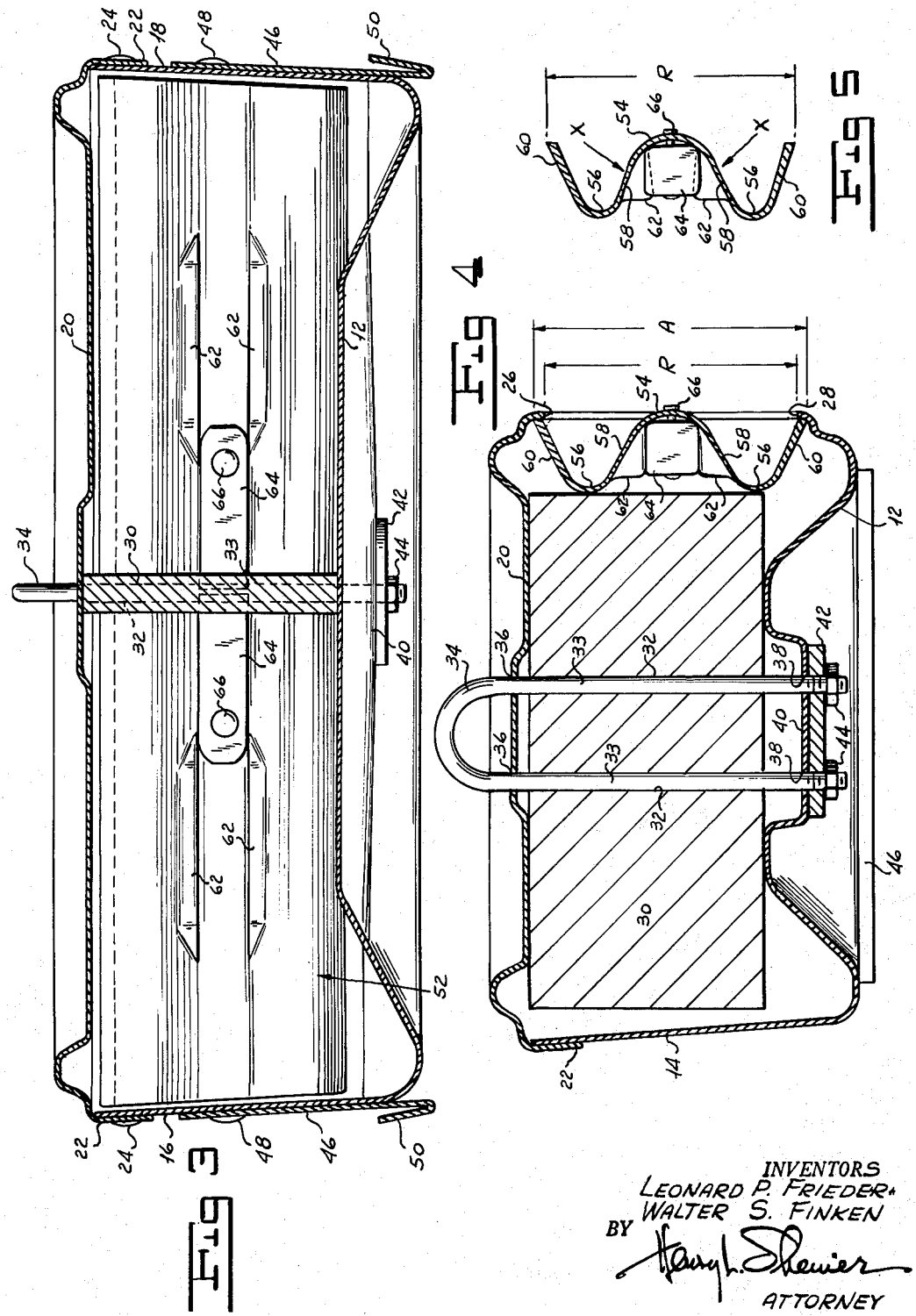
INVENTORS
LEONARD P. FRIEDER
WALTER S. FINKEN
BY
ATTORNEY United States Patent Office 2,742,174
Patented Apr. 17, 1956

2,742,174
RADIOSONDE BATTERY COMPARTMENT

Leonard P. Frieder, Great Neck, and Walter S. Finken, Brooklyn, N. Y.; said Finken assignor to said Frieder Application February 18, 1953, Serial No. 337,508

1 Claim. (Cl. 220—24)

Our invention relates to a battery compartment and more particularly to a radiosonde battery compartment and door therefor, which is simple in construction, economical to manufacture and certain in operation.

Equipment which is dropped with delay opening parachute packs from airplanes must be constructed to withstand severe shock when the parachute is opened. A particular example of a parachute pack for dropping such equipment is disclosed in our Patent No. 2,582,113, in which we show a compartment for housing batteries for supplying power to the equipment which is dropped. This compartment has a molded body, a bottom closure deck riveted to the body and a hinged door on the side to permit access to the batteries. With the closure deck at the bottom, it is necessary to secure it to the compartment body with a large number of rivets in order that the assembly will withstand the inertia load of the batteries when the parachute opens. In addition, the door disclosed in the patent is secured by a pin, such as a cotter pin, to prevent it from opening. This door construction is relatively complex in structure and in operation and expensive to build. We have developed an improved battery compartment and door therefor which is simpler in construction, cheaper to manufacture and more certain in operation.

One object of our invention is to provide an improved radiosonde battery compartment which is simpler in construction, cheaper to manufacture and more certain in operation.

Another object of our invention is the provision of an improved radiosonde battery compartment in which the bottom, back and sides are molded integrally and a top closure deck is secured to the sides by suitable means.

Another object of our invention is the provision of an improved battery compartment having a corrugated door adapted to be snapped into place to close said compartment.

A further object of our invention is to provide an improved door for radiosonde battery compartments which is held in place by forces which are a function of the force with which the batteries bear against the door.

A still further object of our invention is the provision of an improved radiosonde battery compartment in which means is provided for locking the door in place.

Other and further objects of our invention will appear from the following description.

In general our invention contemplates the provision of an improved radiosonde battery compartment having an integrally molded body with a bottom deck and three sides and a separate top closure deck secured to the body by appropriate means such as rivets. We also provide the improved compartment with a corrugated door which can be compressed and snapped into engagement with the top and bottom decks of the compartment to completely close the compartment. The door is provided with means for spreading the corrugations to lock the door securely in place.

In the accompanying drawings which form part of the instant specification and which are to be read in conjunction therewith and in which like reference numerals are used to indicate like parts in the various views:

Figure 3 is a sectional view drawn on an enlarged scale of our improved radiosonde battery compartment taken along the line 3—3 of Figure 1.

Figure 4 is a sectional view drawn on an enlarged scale of our improved radiosonde battery compartment taken along the line 4—4 of Figure 1.

Figure 5 is a view of our improved door in cross-section when compressed for insertion into the compartment opening.

Figure 1:
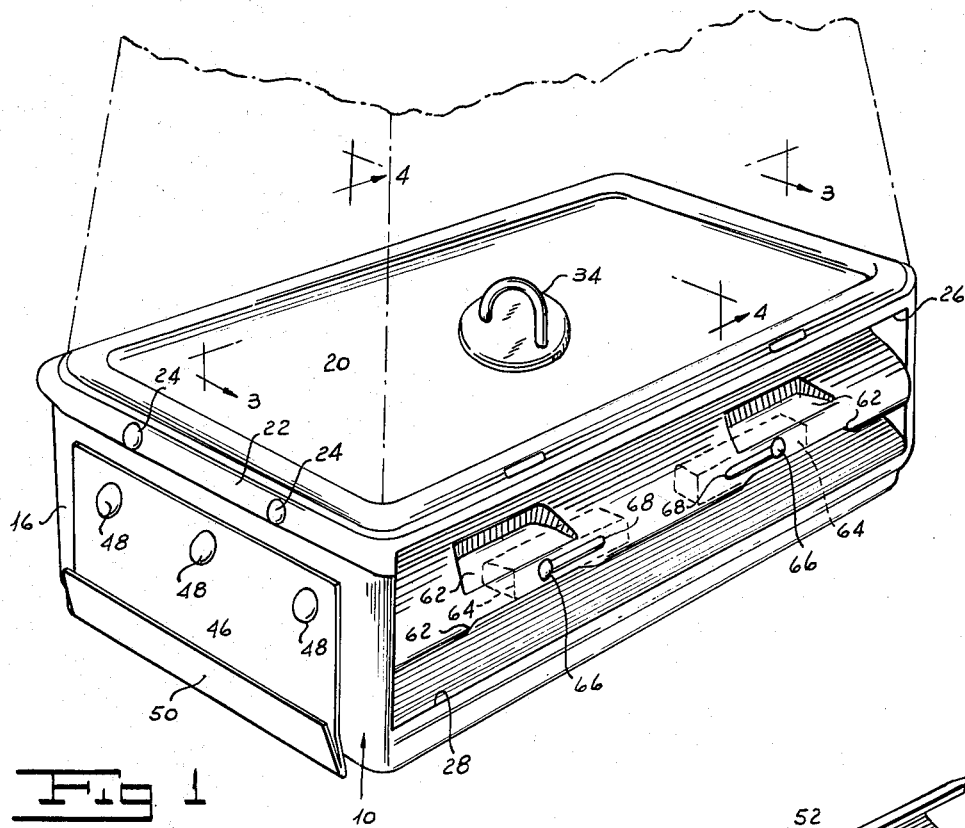
Figure 1 is a perspective view of our improved radiosonde battery compartment with the door locked in place.

More particularly, referring now to the drawings, we mold the body portion, generally indicated at 10, of our improved radiosonde battery compartment as an integral piece. Any appropriate material can be employed, such as fabric of glass fibers impregnated with a suitable thermosetting or thermoplastic resin. The body portion has a bottom deck 12, a rear panel 14 and sides 16 and 18. The top closure deck 20 is formed with a depending flange 22 around its periphery. We attach the top deck 20 to the body by appropriate means such as rivets 24, securing the flange 22 to the sides of the body. It is to be noted that we partially cut away the flange 22 at the front of the top deck to leave a lip 26 along the front edge. A similar lip 28 is formed along the front edge of the bottom deck 12.

A partition 30 of suitable material divides the compartment into two parts, each part or section adapted to receive a battery. The partition is formed with a pair of bores 32 to receive the legs 33 of a U-bolt 34. The legs 33 also pass through holes 36 in the top deck and holes 38 in a platform 40 formed on the bottom deck. The legs of bolt 34 extend below the platform 40 to receive a washer 42 and nuts 44 to retain the bolt in place. The top of bolt 34 extends above the top deck to form an eye for the reception of the suspension cord of the parachute (not shown).

We attach brackets 46 to each of the sides 16 and 18 by appropriate means such as rivets 48 and form upwardly extending flanges 50 on the bottoms thereof. These flanges 50 provide means by which the instrument casing (not shown) may be secured to the battery compartment.

Figure 2:
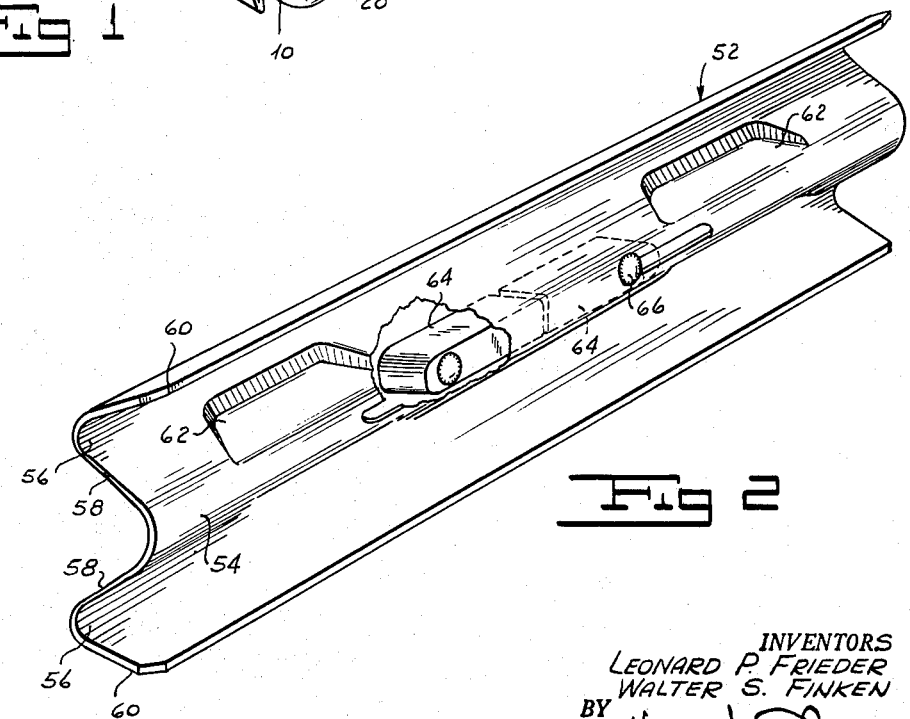
Figure 2 is a perspective view drawn on an enlarged scale of our improved door partially cut away to show the locking means.

The compartment door, indicated generally by reference numeral 52 in Figure 2, may be formed of plastic-impregnated fabric or other suitable material which has some degree of flexibility. Our improved door is corrugated and has a crown 54 and a pair of troughs 56 running along its length. A pair of legs 58 connect the crown or crest 54 with each of the troughs 56. We complete the door with a pair of free legs 60 running outwardly from each of the troughs 56.

It is to be noted, as shown in Figures 2 and 4, that the material of the legs 58 is thinner and has a smaller cross-sectional area than either the crest 54 or the troughs 56. In addition, the free legs 60 of the door are thicker, or of greater cross-sectional area, than the legs 58. If we compress the door from top to bottom, the legs 58 will bend to a greater degree than the remaining parts of the door, since they have the smallest cross-sectional area. That is, if we attempt to squeeze the legs 60 together, the door will bend in the area of legs 58 at points generally indicated by the arrows X in Figure 5.

Each of the legs 58 is indented to form a pair of spaced depressions or finger-grip areas 62. These pairs of depressions are arranged opposite each other to accommodate the thumb and fingers when the door is being compressed for insertion into the compartment.

Within the crest 54 inboard of the depressions 62, we mount a pair of blocks 64 carrying rivets 66. The heads of the rivets 66 extend slightly above the surfaces of blocks 64 and are mounted in slots 68 in the crest 54 so that the blocks may be slid outwardly along the interior of the crest. When the rivet heads are slid outwardly in the slots 68, the blocks will engage the inwardly extending depressions 62 and expand the door to a slight extent. This condition is represented in dotted lines in Figure 1. When the blocks are so disposed, it is impossible to compress the door by squeezing on the depressions 62. In this manner we provide means for locking the door securely in place within the compartment.

In use, our improved radiosonde battery compartment is first formed with the integral body portion 10 and top closure deck 20 in the manner illustrated. Batteries are inserted in each of the sections formed by the partition 30. With the blocks 64 in their inboard positions, to close the compartment, we grasp the door by the depressions 62 and squeeze to reduce the over-all height of the door to some extent. The distance between the ends of the free legs 60 will be approximately the distance R indicated in Figures 4 and 5. We then insert the door into the compartment and release the depressions 62 to allow the door to expand. The door expands so that the distance between the ends of free legs 60 will be approximately equal to the distance A in Figure 4, and the ends of legs 60 will bear on the lips 26 and 28 formed respectively on the top closure deck 20 and the bottom deck 12. To lock the door securely in place and ensure that it will not accidentally compress and free itself from the lips 26 and 28, we then slide the heads of rivets 66 outboard along the slots 68 so that blocks 64 engage the inner surfaces of the depressions 62. When the blocks are so disposed, the door cannot accidentally squeeze together to free itself from the lips 26 and 28.

When the parachute opens, the shock due to the momentum of the batteries will be absorbed in the main by the body portion 10 of the compartment. The shock will not impress itself on the rivets securing the closure deck as it would in the compartment disclosed in Patent No. 2,582,113, previously referred to. This results because in that case a separate bottom closure deck riveted to the body was employed, while we utilize a separate top closure deck.

Should the force due to battery momentum be impressed on our improved door 52, it would only tend to spread the door corrugations and thereby cause the free legs 60 to bear with a greater force on the lips 26 and 28. That is, the legs 60 function as supporting struts between the batteries and the lips 26 and 28 when the batteries impinge on the bases of troughs 56. This is particularly true since we have constructed the door so that substantially all of the bending takes place in the legs 58 of the door. Thus the door is securely retained in the compartment with a force which is a function of the force with which the batteries bear on the cover. In addition we have provided locking means to ensure against an accidental compression of the door which would disengage the ends of legs 60 from the lips on which they bear. It is also to be noted that our improved door prevents undue shifting of the batteries within the compartment because the troughs 56 extend within the compartment along its length to occupy the space to which the batteries normally could shift. Accidental derangement of electrical contact is thereby prevented. The depth of the corrugations is governed by the distance between the battery faces and the plane of the lips 26 and 28.

Thus it will be seen that we have accomplished the objects of our invention in providing a radiosonde battery compartment which is simple in construction, economical to manufacture and certain in operation. We have utilized a separate top rather than a separate bottom closure deck to minimize the possibility of failure of the compartment under impact. We provide the compartment with an improved door of corrugated cross-section which may be simply snapped in place and which has locking means for securely retaining the cover within the compartment. When the door is snapped in place and the locking blocks are in position, the cover is retained within the compartment by a force which is a function of the force with which the batteries bear on the door. In addition, because of the corrugated cross-section, it occupies excess space within the compartment and prevents undue shifting of the batteries.

It will be understood that certain features and subcombinations are of utility and may be employed without reference to other features and subcombinations. This is contemplated by and is within the scope of our claim. It is further obvious that various changes may be made in details within the scope of our claim without departing from the spirit of our invention. It is therefore to be understood that our invention is not to be limited to the specific details shown and described.

Having thus described our invention, what we claim is:

In a device of the character described a corrugated door including a crest, troughs disposed on either side of said crest, first legs joining said troughs to said crest, second free legs running outwardly from said troughs to complete the door, each of said first legs being provided with spaced depressions, a pair of blocks and means mounting said blocks intermediate the spaced depressions in one of said legs for limited sliding movement along the interior of said crest toward and away from the respective depressions, the arrangement being such that when said blocks are moved toward respective depressions they cooperate with said depressions to prevent compression of said door.

References Cited in the file of this patent

UNITED STATES PATENTS

| | | |
|---|---|---|
| 1,689,646 | Tutsch | Oct. 30, 1928 |
| 2,167,691 | Shoemaker | Aug. 1, 1939 |
| 2,282,011 | Vischer | May 5, 1942 |